United States Patent
Mehaffey et al.

(10) Patent No.: US 11,311,826 B2
(45) Date of Patent: Apr. 26, 2022

(54) PRE-FILTER SYSTEM

(71) Applicant: Mehaffey Woodlands, LLLP, Dawsonville, GA (US)

(72) Inventors: Joseph H. Mehaffey, Dawsonville, GA (US); Jesse Ryan Swofford, Dawsonville, GA (US)

(73) Assignee: Mehaffey Woodlands, LLLP, Dawsonville, GA (US)

( * ) Notice: Subject to any disclaimer, the term of this patent is extended or adjusted under 35 U.S.C. 154(b) by 109 days.

(21) Appl. No.: 16/671,603

(22) Filed: Nov. 1, 2019

(65) Prior Publication Data

US 2021/0129053 A1 May 6, 2021

(51) Int. Cl.
| | |
|---|---|
| *B01D 29/31* | (2006.01) |
| *B01D 35/05* | (2006.01) |
| *F16L 9/22* | (2006.01) |
| *B01D 46/88* | (2022.01) |
| *F16L 1/24* | (2006.01) |

(52) U.S. Cl.
CPC ............. *B01D 35/05* (2013.01); *B01D 23/06* (2013.01); *B01D 46/88* (2022.01); *F16L 9/22* (2013.01); *F16L 1/24* (2013.01)

(58) Field of Classification Search
CPC ........ B01D 23/06; B01D 29/31; B01D 35/05; F16L 9/22
See application file for complete search history.

(56) References Cited

U.S. PATENT DOCUMENTS

| | | | | |
|---|---|---|---|---|
| 6,279,187 | B1 * | 8/2001 | Herrington | A01K 63/10 15/1.7 |
| 7,575,677 | B1 * | 8/2009 | Barnes | B01D 29/15 210/232 |
| 2014/0197091 | A1 * | 7/2014 | Andersen | B01D 29/15 210/323.2 |
| 2014/0305880 | A1 * | 10/2014 | Roche | B01D 35/02 210/747.5 |
| 2016/0068412 | A1 * | 3/2016 | Lim | B01D 61/08 210/652 |
| 2017/0349455 | A1 * | 12/2017 | Katz | E21B 43/20 |
| 2020/0095135 | A1 * | 3/2020 | Cornish | E02B 15/045 |

* cited by examiner

*Primary Examiner* — Bradley R Spies
(74) *Attorney, Agent, or Firm* — Troutman Pepper Hamilton Sanders LLP; James E. Schutz; Micah B. Hensley

(57) ABSTRACT

The disclosed technology includes pre-filter system that can include a filter portion comprising pipes, elbows, and tees. The pipes can include apertures. The pipes, elbows, and tees can be positioned such that a first end of a first group of neighboring pipes can be fluidly connected to form a column of fluid connection and a second end of a second group of neighboring pipes can be fluidly connected to form a row of fluid connection. The apertures of at least some of the pipes can be covered with a mesh netting. The pre-filter system can include an airtight float portion. The float portion can be attached to the filter portion to provide a predetermined amount of buoyancy to the pre-filter system.

14 Claims, 5 Drawing Sheets

PRE-FILTER SYSTEM

BACKGROUND

Water pump systems can be used to transfer or circulate water with a water source, such as a pond, pool, lake, lagoon, stream, creek, river, or the like. For example, a water pump system can be used in conjunction with a filter system to remove undesired items from water that is being removed or transported from a water source. Typical water pump systems can generally pass or pump water that includes small particles of debris and/or organisms (e.g., algae), but larger pieces of debris (e.g., sticks) can restrict, stop, damage, or destroy the pump. Further, any larger pieces caught by a filter can reduce the useful life of the filter because typical filters are generally not designed to manage large pieces of debris (or large quantities of debris).

Thus, it may be useful to include a pre-filter system disposed upline of the pump and that can prevent large pieces and/or large quantities of debris and/or organisms from entering the intake of the pump. Existing pre-filter systems, however, are generally pre-fabricated and can be difficult to customize for a given scenario or application. Further, existing pre-filter systems can be heavy and cumbersome to transport or maneuver. Further still, existing filter systems can also be expensive and time consuming to fabricate. Adding to the associated cost and complexity, existing designs may require several different types of materials and components.

SUMMARY

These and other problems can be addressed by the technology disclosed herein. The disclosed technology can include pre-filter system having a filter section and a float section. The float section can be rigidly attached to the filter section, and the float section can be at least partially buoyant such that the pre-filter section can be positioned at a predetermined depth or height from a bottom of a water source.

The disclosed technology includes a pre-filter system that can comprise a rigid, self-supporting filter portion. The filter portion can comprise a network of pipes, elbows, and tees, and at least some of the pipes can comprise apertures. The network can comprise a first pipe that is fluidly connected at a first end to a second pipe via at least a first elbow and a first tee, and the first pipe can be fluidly connected at a second end to a third pipe via at least a second elbow and a second tee. The first elbow and the first tee can form a columnar fluid connection between the first and second pipes, and the second elbow and the second tee can form a row-wise fluid connection between the first and third pipes.

The columnar fluid connection can be a first columnar fluid connection, and the row-wise fluid connection can be a first row-wise fluid connection. The filter portion can comprise a first bolt and a second bolt. The first bolt can be parallel to the first row-wise fluid connection and can extend between the first columnar fluid connection and a second columnar fluid connection. The second bolt can be parallel to the first columnar fluid connection and can extend between the first row-wise fluid connection and a second row-wise fluid connection.

The columnar fluid connection can be of a plurality of columnar fluid connections, and the row-wise fluid connection can be of a plurality of row-wise fluid connections. The filter portion can comprise a first rod extending through each of plurality of columnar fluid connections and a second rod extending through each of the plurality of row-wise fluid connections.

The apertures can be uniformly sized.

The pre-filter system can comprise a mesh netting disposed about an external surface of the first pipe such that the mesh netting covers the apertures of the first pipe.

The filter portion can omit adhesive such that all components of the filter portion are unadhered to one another.

The pre-filter system can comprise an airtight float portion.

The float portion can be detachably attached to the filter portion.

The float portion can comprise the same material as the filter portion.

The float portion and the filter portion each can comprise polyethylene, polyvinyl chloride (PVC), polypropylene, polystyrene, acrylic, or nylon.

The float portion and the filter portion each can comprise PVC plumbing components.

The filter portion can comprise an outlet that is detachably attachable to a hose.

The disclosed technology can include a pump system that comprises a pump and a prefilter system fluidly connected to the pump via a hose. The pre-filter system can comprise a rigid, self-supporting filter portion including a plurality of pipes arranged in a grid. A first end of each pipe of the plurality of pipes can be fluidly connected to a first end of at least one pipe that is adjacent in a column of the grid, and a second end of each pipe of the plurality of pipes can fluidly connected to a second end of at least one pipe that is adjacent in a row of the grid. Each pipe of the plurality of pipes can comprise apertures of a predetermined diameter.

The pre-filter further can comprise a float portion attached to the filter portion.

The float portion can comprise the same material as the filter portion.

The float portion and the filter portion each can comprise polyethylene, polyvinyl chloride (PVC), polypropylene, polystyrene, acrylic, or nylon.

The float portion and the filter portion each can comprise PVC plumbing components.

The disclosed technology can include a method of manufacturing a pre-filter system. The method can comprise drilling holes in a first pipe, a second pipe, and a third pipe; connecting a first elbow to a first end of the first pipe; connecting a first tee to the first elbow and a second elbow; connecting the second elbow to a first end of the second pipe; connecting a third elbow to a second end of the first pipe; connecting a second tee to the third elbow and a fourth elbow; and connecting the fourth elbow to a second end of the third pipe. The first elbow, first tee, and second elbow can form a fluid connection in a first direction, and the third elbow, second tee, and fourth elbow can form a fluid connection in a second direction. The second direction can be rotated 90° with respect to the first direction.

The method can comprise covering at least one of the first, second, and third pipes with a mesh netting.

The method can include forming a float portion by connecting, using a water-proof adhesive, a fifth elbow to a third tee and a first end of a fourth pipe; connecting, using a water-proof adhesive, the third tee to a sixth elbow and a first end of a fifth pipe; connecting, using a water-proof adhesive, the sixth elbow to a first end of a sixth pipe; connecting, using a water-proof adhesive, a seventh elbow to a second end of the fourth pipe and a fourth tee; connecting, using a water-proof adhesive, the fourth tee to an eighth elbow and a second end of the fifth pipe; and connecting, using a water-proof adhesive, the eighth elbow to a second end of the sixth pipe. The method can include attaching the float portion to the filter portion.

Additional features, functionalities, and applications of the disclosed technology are discussed in more detail herein.

BRIEF DESCRIPTION OF THE FIGURES

Reference will now be made to the accompanying figures, which are not necessarily drawn to scale, and wherein.

DETAILED DESCRIPTION

Figure 1:
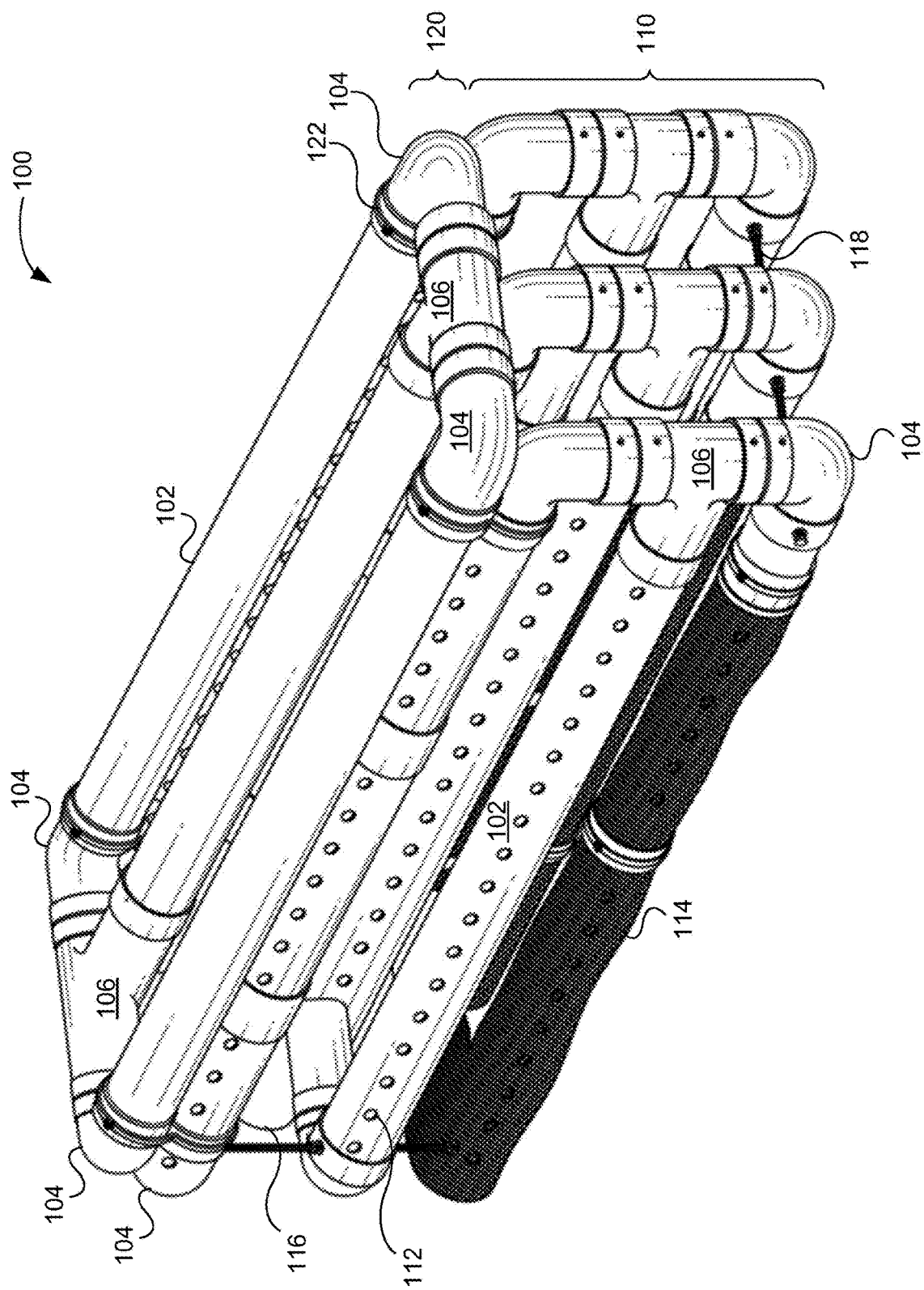
FIG. 1 is a perspective view of an example pre-filter system, according to the present disclosure.

Throughout this disclosure, certain examples are described in relation to a pre-filter system. But the disclosed technology is not so limited. The disclosed technology can be effective as a pre-filter subsystem for use within a filter system and/or a water pump system. The disclosed technology can be effective in preventing large pieces and/or quantities of debris or other unwanted items from entering a water pump system and/or a water filter system.

The disclosed technology will be described more fully hereinafter with reference to the accompanying drawings. This disclosed technology can, however, be embodied in many different forms and should not be construed as limited to the examples set forth herein. The components described hereinafter as making up various elements of the disclosed technology are intended to be illustrative and not restrictive. Many suitable components that would perform the same or similar functions as components described herein are intended to be embraced within the scope of the disclosed devices and methods. Such other components not described herein may include, but are not limited to, for example, components comprising materials developed after development of the disclosed technology.

In the following description, numerous specific details are set forth. But it is to be understood that examples of the disclosed technology can be practiced without these specific details. In other instances, well-known methods, structures, and techniques have not been shown in detail in order not to obscure an understanding of this description. References to one or more certain examples of the disclosed technology may include a particular feature, structure, or characteristic, but the disclosed technology does not necessarily include the particular feature, structure, or characteristic. Further, references to the features of various examples of the disclosed technology does not necessarily refer to the same example, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described should be in a given sequence, either temporally, spatially, in ranking, or in any other manner.

The disclosed technology relates to a pre-filter system, which can be useful for use with a water pump system and/or a filter system. The pre-filter system can be configured to remove objects (e.g., debris, organisms) above a predetermined size. The pre-filter system can be configured to fluidly connect to a water pump system and/or a filter system (e.g., via a pipe or tubing) such that water can be drawn from a water source, through the pre-filter system, and to the water pump system and/or filter system. Thus, the pre-filter system can be configured to prevent objects above the predetermined size from being transported to a pump system including a filter, a pump system without a filter, or any other system configured to pump, pass, or transport water. As used herein, the term "pre-filter" refers to a system that removes or filters objects from water or another liquid prior to the liquid entering a subsequent system (e.g., a filter system and/or a pump system), and use of the term "pre-filter" does not necessarily indicate that the overall system (e.g., a pre-filter system and a pump system) includes multiple filtering stages or subsystems. Various aspects and functionalities of the disclosed technology are discussed more fully below.

Figure 2:
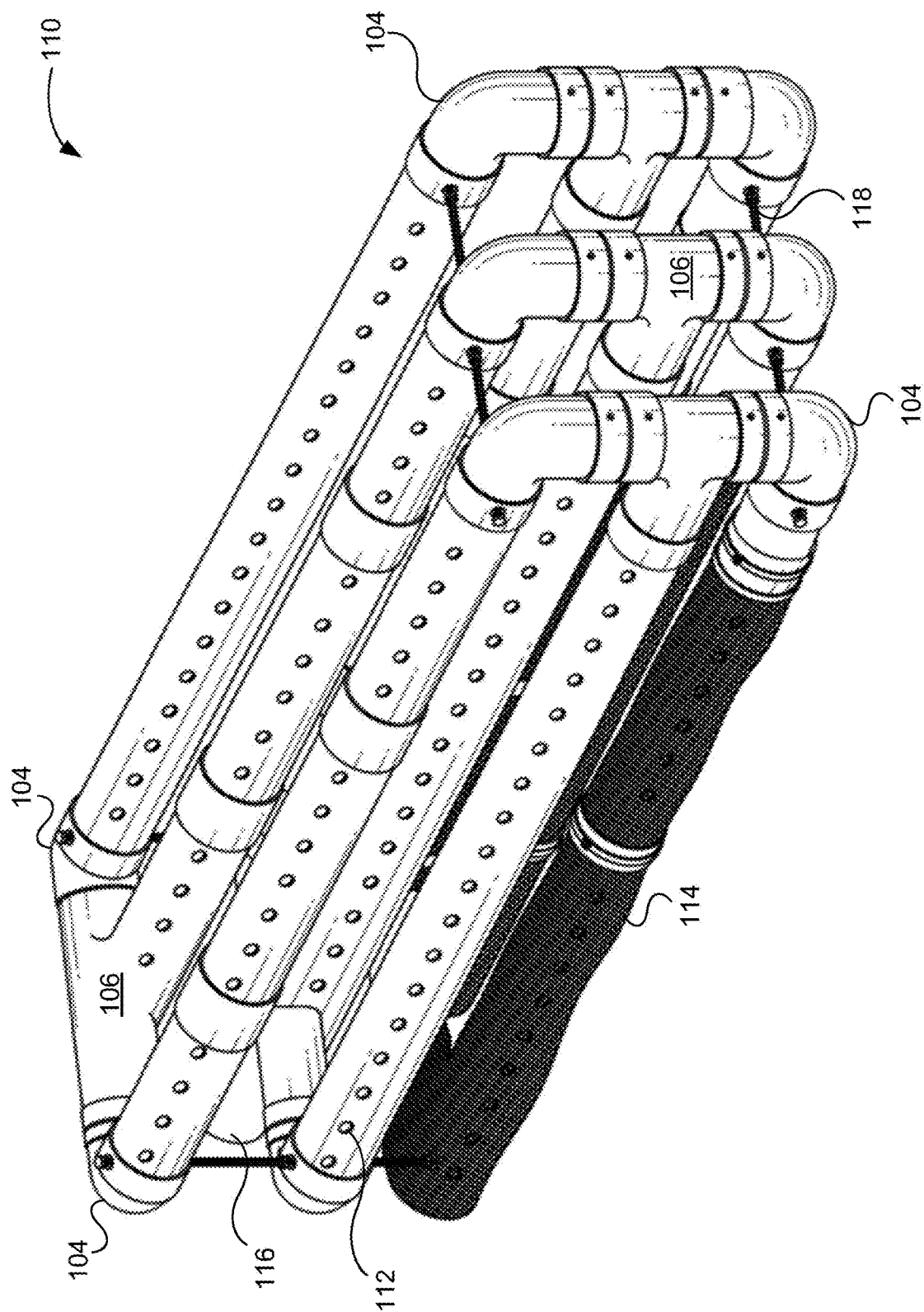
FIG. 2 is a perspective view of an example pre-filter system without a float section, according to the present disclosure.

FIG. 1 shows an example pre-filter system 100 including a filter portion 110 and a float portion 120, and FIG. 2 shows the filter portion 110 alone. The filter portion 110 can fabricated from commercially available products. For example, the filter portion 110 can include multiple pipes 102, and either end of each pipe 102 can be fluidly connected to a corner piece or elbow 104. Adjacent elbows 104 can be connected by another pipe 102 or a three-way tee 106, depending on the configuration of the filter portion 110. The pipes 102 can have a diameter in the range of approximately one inch to approximately eight inches. For example, the pipes 102 can have a diameter of approximately one inch, two inches, approximately three inches, approximately four inches, approximately five inches, approximately six inches, approximately seven inches, or approximately eight inches. As will be appreciated, a pipe 102 diameter of approximately four inches can be useful for a number of applications. Nonetheless, certain environments or applications can require a different pipe 102 diameter such as those described above.

The pipes 102, elbows 104, and tees 106 can comprise the same material. The pipes 102, elbows 104, and tees 106 can comprise a rigid material. Thus, the filter portion 110 itself can provide an integrated structural frame such that the filter portion 110 is self-supporting. This may be beneficial over existing designs, which often require use of central structure, such as a metal frame, and a separate filtering systems that includes flexible tubing or similar components. The pipes 102, elbows 104, and tees 106 can be made of any suitable plastic, such as polyethylene, polyvinyl chloride (PVC), polypropylene, polystyrene, acrylic, nylon, or the like. The pipes 102, elbows 104, and tees 106 can be commercially available plumbing components, such as PVC plumbing components.

When assembled, the filter portion 110 can include rows and columns of pipes 102, as shown most clearly in FIG. 2.

Figure 3:
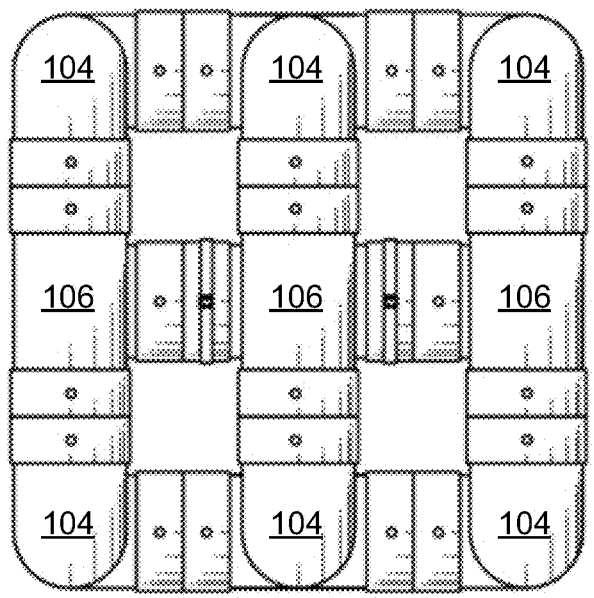
FIG. 3 is an end view of an example pre-filter system without a float section, according to the present disclosure.
Figure 4:
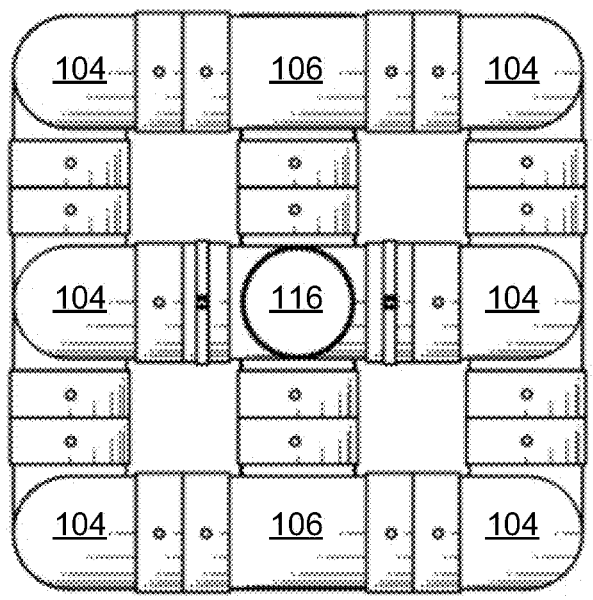
FIG. 4 is an end view of an example pre-filter system without a float section, according to the present disclosure.

As discussed herein, the "rows" and "columns" of pipes refer to the configuration of pipes 102 as viewed from an end of the pipes 102, such as shown in FIGS. 3 and 4. The filter portion 110 can be configured such that the tees 106 at one end of the filter portion 110 are rotated 90° with respect to the tees 106 at the opposite end of the filter portion. An example of this configuration is shown in FIGS. 3 and 4, in particular. Referring to FIG. 3, the tees 106 at a first end of the filter portion 110 can be in a general vertical orientation, and referring to FIG. 4, the tees 106 at a second end of the filter portion 110 can be in a general horizontal orientation. Stated otherwise, a first end of a given pipe 102 can be fluidly connected to an end of an adjacent pipe 102 of a shared column but different row via an elbow 104 and/or a tee 106 (as shown in FIG. 3), and the second, opposite end of the given pipe 102 can be fluidly connected to an end of adjacent pipe 102 of a shared row but different column via an elbow 104 and/or a tee 106 (as shown in FIG. 4).

FIGS. 1-4 show an example filter portion 110 including pipes 102 arranged in three rows and three columns, but the disclosed technology is not so limited. As will be appreciated by one having skill in the art, the disclosed technology can include any number of rows and columns. For example, the filter portion 110 can include one, two, three, four, five, six, seven, eight, nine, ten, or more rows of pipes 102 and/or one, two, three, four, five, six, seven, eight, nine, ten, or more columns of pipes 102. As shown most clearly in FIG. 2, each pipe 102 can one or more pipe sections. For example, the top row of pipes 102 shown in FIG. 2 shows a pipe 102 having one pipe section, a pipe 102 having two pipe sections, and a pipe 102 having three pipe sections. A pipe 102 can have any other number of pipe sections, such as four, five, six, seven, eight, nine, ten, or more.

One, some, or all of the pipes 102 can include apertures 112, and the apertures 112 can have a predetermined diameter. For example, the diameter of the apertures 112 can be in the range of approximately one-eighth inch to approximately one inch. As more specific examples, the diameter of the apertures 112 can be approximately one-eighth inch, approximately one-fourth inch, approximately three-eighths inch, approximately one-half inch, approximately five eighths inch, approximately three-quarters inch, approximately seven-eighths inch, or approximately one inch. Alternatively or in addition, one, some, or all of the elbows 104 and/or tees 106 can include apertures 112. The number of apertures 112 and the locations of apertures 112 can be varied based on the types of local debris (e.g., mud or silt only; leaves; branches or limbs) and pump limitations (e.g., pump power or pumping capabilities). For example, in a scenario in which the filter portion 110 is located near the bottom of a muddy water source, apertures 112 may be disposed only along the top of pipes to help prevent unwanted introduction of mud into the filter portion 110. The size of the apertures 112 can vary based on location with respect to the pipes 102 of the filter portion 110. For example, the pipes can have a top portion generally facing the float portion 120 (or where the float portion 120 would or could be located), a bottom portion generally opposite the top portion (e.g., facing the bottom of the water source), and one or more middle portions disposed between the top and bottom portions. The sizes of the apertures 112 located within the respective top, middle, and bottom portions can differ. For example, each aperture 112 located within the top portion can have a diameter within a first predetermined range, each aperture 112 located within the middle portion (s) can have a diameter within a second predetermined range, and each aperture 112 located within the bottom portion can have a diameter within a third predetermined range. The first predetermined range can be less than the second predetermined range, and the second predetermined range can be less than the third predetermined range.

The pipes 102, elbows 104, and tees 106 can be mechanically connected to one another without the use of any adhesive. Omission of an adhesive can be advantageous in certain circumstances. For example, lack of an adhesive can make it easier to disassemble some or all of the filter portion 110 for repair or removal of debris from within the filter portion 110. To maintain structural rigidity between the various rows and columns of the filter portion 110, one or more bolts or rods 108 can extend through neighboring elbows 104, as shown in FIGS. 1 and 2. Alternatively or in addition, one or more bolts or rods 108 can extend through neighboring pipes 102 and/or tees 106. The rods 108 can include threads configured to mate with nuts. As will be appreciated by a person having skill in the art, sections of the filter portion 110 can be quickly and easily disassembled to repair damaged components.

The filter portion 110 can include a mesh netting 114 that can be laid over the exterior of one or more sections of the filter portion 110 that includes apertures 112, and the mesh netting 114 can be attached to one or more pipes 102 of the filter portion 110. The mesh netting 114 can be removably attached to one or more pipes 102. For example, the mesh netting 114 can be attached to a pipe 102 with zip ties, releasable cable ties, straps with buckles, hook and loop straps, cable seals, metal clamp strips, metal pipe strips, or the like. The mesh netting 114 can cover one, some, or all of the sections of the filter portion 110 that includes apertures 112. The mesh netting 114 can cover only those sections of the filter portion 110 including apertures 112 that are most likely to become clogged with silt, sediment, mud, or other materials. Thus, to remove any clogs caused by the silt, sediment, mud, or other materials, the mesh netting 114 can be simply removed and cleaned or replaced. Accordingly, the mesh netting 114 can help facilitate easy cleaning or removal of clogs caused by silt, sediment, mud, or similar materials, which may otherwise require that the filter portion 110 be at least partially disassembled to remove the material from the interior of the clogged section of the filter portion 110.

The filter portion 110 can also include an outlet 116 that is attachable to a hose or conduit (e.g., hose 602 as discussed below) such that water can be drawn from the water source and through the filter portion 110. For example, referring to FIGS. 1, 2, and 4, the outlet 116 can be located at an end of the filter portion 110, such as between two elbows 104. The outlet 116 can be formed by a double sanitary tee positioned in a location that would otherwise include a tee 106. That is, as opposed to the tee's 106 three openings (e.g., two legs of the tee 106 that are directly opposite one another and a third leg forming a right angle with either of the other legs), the outlet 116 can be provided by a component having four openings (e.g., two sets of legs that directly opposite one another such that any given leg forms a right angle with either adjacent leg). The location of the outlet 116 is not so limited, however. The outlet 116 can be disposed elsewhere on the filter portion 110, such as between pipe sections (e.g., a tee 106 positioned between two pipe sections of a pipe 102). The outlet 116 can have a diameter in the range of approximately one inch to approximately eight inches. For example, the outlet 116 can have a diameter of approximately one inch, two inches, approximately three inches, approximately four inches, approximately five inches, approximately six inches, approximately seven inches, approximately eight inches, or larger, as desired. The outlet can be detachably attachable to the hose. For example, the outlet 116 can be attachable to the hose via screw threads (whether internal or external on the outlet 116), a snap connection, a zip tie, a releasable cable tie, a strap with a buckle, a hook and loop strap, a cable seal, a metal clamp strip, a metal pipe strip, or the like.

Figure 5:
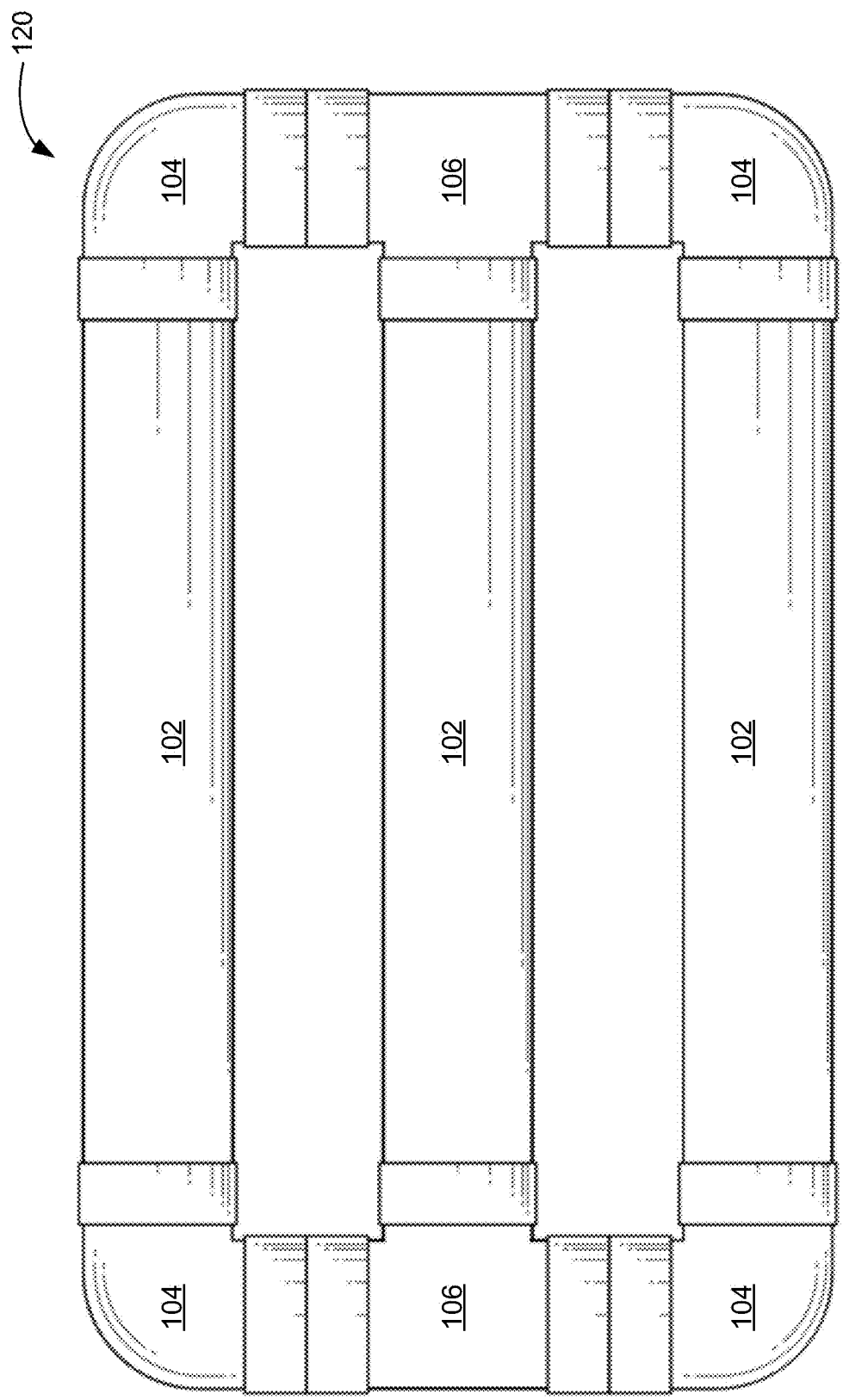
FIG. 5 is a top view of an example float section, according to the present disclosure.

Referring to FIGS. 1 and 5, the float portion 120 can be made of pipes 102, elbows 104, and tees 106, similar to the construction of the filter portion 110. The float portion 120 can be constructed from the same material as the filter portion 110. For example, the various components of the float portion 120 can comprise can be made of any suitable plastic, such as polyethylene, polyvinyl chloride (PVC), polypropylene, polystyrene, acrylic, nylon, or the like. To ensure the float portion 120 is airtight such that the float portion is buoyant, the float portion 120 can include water-tight and air-tight adhesive (e.g., glue, PVC cement) and/or a water-tight and air-tight sealant (e.g., silicone) to prevent water from entering into the internal cavity of the float portion 120. The float portion 120 can include only air, such that a dedicated buoyant material (e.g., cork, balsa wood, kapok or plastic foams) is not required. This may simply construction and may reduce the cost of the pre-filter system 100.

The float portion 120 can be attached to the filter portion 110. The float portion 120 can be detachably attached to the filter portion 110. For example, the float portion 120 can be attached to the filter portion 110 with zip ties, releasable cable ties, straps with buckles, hook and loop straps, cable seals, metal clamp strips, metal pipe strips, or the like.

The float portion 120 can include a single row of pipes 102, as shown in FIG. 1. The float portion 120 can include multiple rows of pipes 102 (e.g., by replacing at least some of the three-way tees 106 with four-way tees and including additional elbows and/or pipes 102). The float portion 120 can include multiple instances of the float shown in FIG. 5 to form a float portion with multiple levels.

As will be appreciated by a person having skill in the art, the size and buoyancy of the float portion 120 can be determined based on the weight of the filter portion 110 and/or the overall weight of the pre-filter system 100, as well as on the desired position of the pre-filter system 100 in the water source. For example, the size of the float portion 120 may determine the overall buoyancy of the pre-filter system 100 such that the pre-filter system 100 can be positively buoyant (i.e., floats), negatively buoyant (i.e., sinks), or neutrally buoyant (i.e., is suspended in the liquid). Thus, the float portion 120 can be designed and/or sized such that the pre-filter system 100 floats to intake water near the surface of a water source. Alternatively, the float portion 120 can be designed and/or sized such that the pre-filter system 100 is suspended in the water at a predetermined depth and/or height above the bottom of the water source such that the pre-filter system 100 can intake water from the predetermined depth. Alternatively, the float portion 120 can be can be designed and/or sized such that the pre-filter system 100 sinks to the bottom of the water source to intake water from the floor of the water source. In such an embodiment, the pre-filter system 100 can omit the float portion 120. Sections of the float portion 120 can be added or removed to adjust the buoyancy (and depth) of the pre-filter system 100, as desired.

Figure 6:
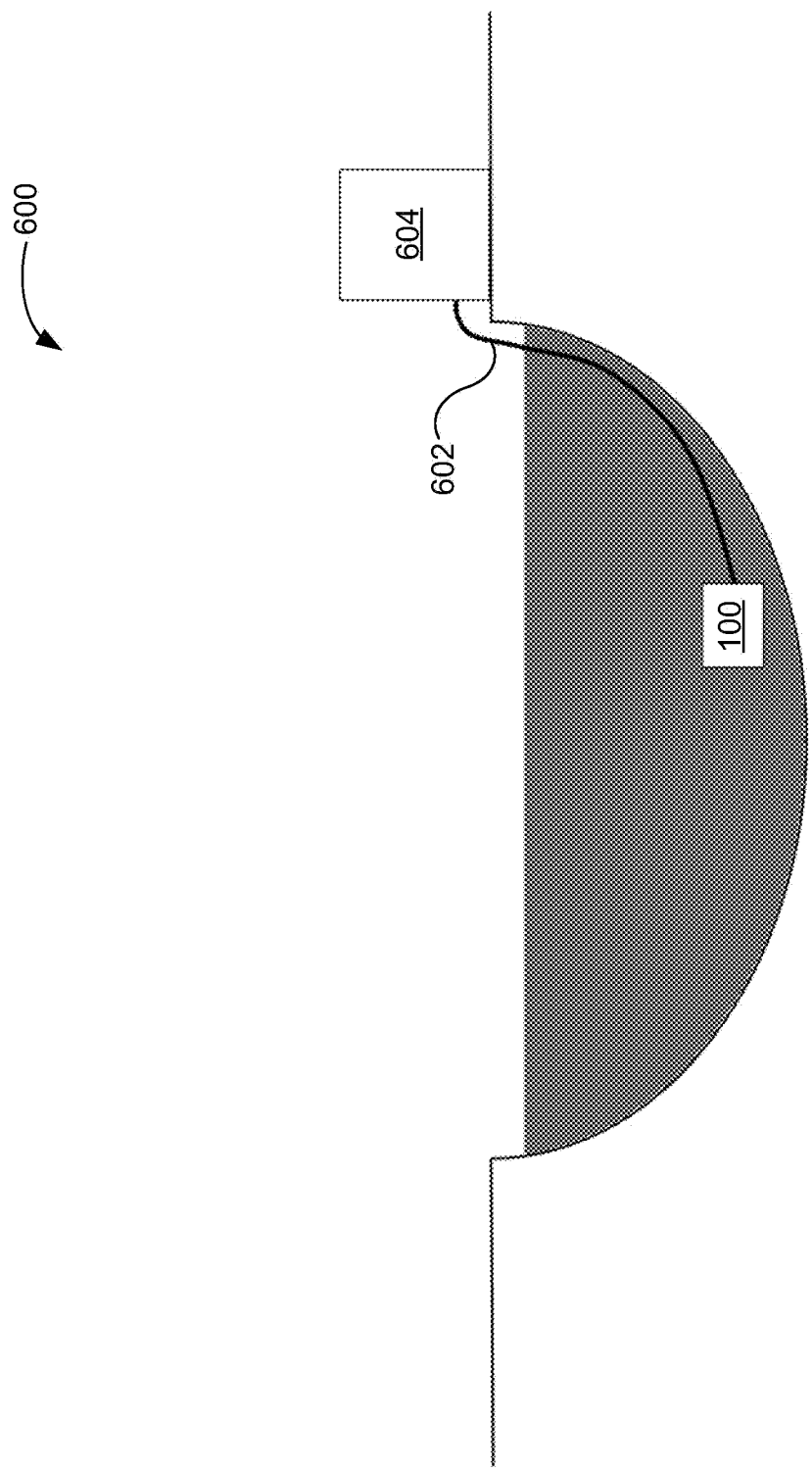
FIG. 6 is a schematic diagram of a filter system in fluid communication with a pump system, according to the present disclosure.

Referring to FIG. 6, the pre-filter system 100 can be incorporated into a filter system 600, and the pre-filter system 100 can be fluidly connected to a hose 602, as mentioned above. The opposite end of the hose 602 can be attached to a pump system 604, and the pump system 604 can be configured to apply suction or pressure to cause water to be collected from a water source, through the apertures 112 of the filter portion 110 of the pre-filter system 100, and through the hose 602 to the pump system 604 such that the pump system 604 can output the water to a desired location.

The disclosed technology further includes methods for manufacturing the pre-filter system 100, the filter system 600, or any other aspects of this disclosure. A person of skill in the art will recognize the methods of assembly based on the description and figures provided herein. For example, the apertures 112 of the filter portion 110 can be created by drilling holes into the pipes 102 or other components of the filter portion 110. As other examples, the apertures 112 can be punched into the pipes 102 or other components, or the apertures can be cast into the pipes 102 or other components during manufacturing. The pipes 102, elbows 104, and tees 106 can be connected to one another as explained and shown herein. Similarly, the float portion 120 can be created by attaching or connecting, via a water-proof or water-tight adhesive or sealant, the pipes 102, elbows 104, and tees 106 as explained and shown herein. By sealing air inside the float portion 120 as described and by attaching the float portion 120 to the filter portion 110, the float portion 120 can cause the pre-filter system 100 to become buoyant.

While certain examples of the disclosed technology have been described in connection with what is presently considered to be the most practical embodiments, it is to be understood that the disclosed technology is not to be limited to the disclosed examples, but on the contrary, is intended to cover various modifications and equivalent arrangements included within the scope of the appended claims. Although specific terms are employed herein, they are used in a generic and descriptive sense only and not for purposes of limitation.

What is claimed is:

1. A pre-filter system comprising:
a rigid, self-supporting filter portion comprising a network of pipes, elbows, and tees, at least some of the pipes comprising apertures and the network comprising a first pipe that is (i) fluidly connected at a first end to a second pipe via at least a first elbow and a first tee and (ii) fluidly connected at a second end to a third pipe via at least a second elbow and a second tee,
wherein:
each of the first tee and the second tee has three openings including a first opening, a second opening opposite the first opening, and a third opening having a central axis that intersects a central axis of at least one of the first and second openings,
the first end of the first pipe is attached to the third opening of the first tee,
the second end of the first pipe is attached to the third opening of the second tee, and
the at least the first elbow and the first tee form a columnar fluid connection between the first and second pipes and the at least the second elbow and the second tee form a row-wise fluid connection between the first and third pipes.

2. The pre-filter system of claim 1, wherein the columnar fluid connection is a first columnar fluid connection, the row-wise fluid connection is a first row-wise fluid connection, and the filter portion comprises:
a first bolt (i) parallel to the first row-wise fluid connection and (ii) extending between the first columnar fluid connection and a second columnar fluid connection; and a second bolt (i) parallel to the first columnar fluid connection and (ii) extending between the first row-wise fluid connection and a second row-wise fluid connection.

3. The pre-filter system of claim 1, wherein the columnar fluid connection is of a plurality of columnar fluid connections, the row-wise fluid connection is of a plurality of row-wise fluid connections, and the filter portion comprises a first rod extending through each of plurality of columnar fluid connections and a second rod extending through each of the plurality of row-wise fluid connections.

4. The pre-filter system of claim 1, wherein the apertures are uniformly sized.

5. The pre-filter system of claim 1 further comprising a mesh netting disposed about an external surface of the first pipe such that the mesh netting covers the apertures of the first pipe.

6. The pre-filter system of claim 1, wherein all components of the filter portion are unadhered to one another.

7. The pre-filter system of claim 1 further comprising an airtight float portion.

8. The pre-filter system of claim 7, wherein the float portion is detachably attached to the filter portion.

9. The pre-filter system of claim 7, wherein the float portion comprises the same material as the filter portion.

10. The pre-filter system of claim 9, wherein the float portion and the filter portion each comprise polyethylene, polyvinyl chloride (PVC), polypropylene, polystyrene, acrylic, or nylon.

11. The pre-filter system of claim 10, wherein the float portion and the filter portion each comprise PVC plumbing components.

12. The pre-filter system of claim 1, wherein the filter portion comprises an outlet that is detachably attachable to a hose.

13. A pre-filter system comprising:
a rigid, self-supporting filter portion comprising:
a plurality of pipes disposed in a parallel arrangement and forming a configuration having a plurality of rows and a plurality of columns when the plurality of pipes extends in a first generally horizontal direction, each of the plurality of pipes having a sidewall and at least some of the plurality of pipes having one or more inlet holes extending through the respective sidewall;
a plurality of tees, each of the plurality of tees (i) having three openings including a first opening, a second opening opposite the first opening, and a third opening having a central axis that intersects a central axis of at least one of the first and second openings and (ii) being configured to attach to an end of a corresponding pipe of the plurality of pipes via the third opening;
a plurality of elbows configured to attach to (i) an end of a corresponding pipe of the plurality of pipes and (ii) either the first opening or the second opening of a corresponding tee of the plurality of tees, each of the plurality of elbows having a 90-degree bend; and
an outlet configured to attached to a pump hose,
wherein at a first end of the configuration:
for each pipe of the plurality pipes that is located in a top row of the configuration or a bottom row of the configuration, a first end of the corresponding pipe is attached to an elbow of the plurality of elbows, and
for each pipe of the plurality pipes that is located in a middle row of the configuration, a first end of the corresponding pipe is attached to the third opening of a tee of the plurality of tees, and
wherein at a second end of the configuration:
for each pipe of the plurality pipes that is located in a first column of the configuration or a last column of the configuration, a second end of the corresponding pipe is attached to an elbow of the plurality of elbows, the central axis of the at least one of the first and second openings for each tee on the first end of the corresponding pipes extending in a generally vertical direction, and
for each pipe of the plurality pipes that is located in a middle column of the configuration, a second end of the corresponding pipe is attached to the third opening of a tee of the plurality of tees, the central axis of the at least one of the first and second openings for each tee on the second end of the corresponding pipes extending in a second generally horizontal direction.

14. The pre-filter system of claim 13, wherein each of the plurality of pipes has the same dimensions, each of the plurality of tees has the same dimensions, and each of the plurality of elbows has the same dimensions.

* * * * *